Patented Nov. 15, 1938

2,137,143

UNITED STATES PATENT OFFICE 2,137,143

SULPHONATED COERULEINS AND PROCESS FOR THEIR MANUFACTURE

Eduard Peyer, Basel, Switzerland, assignor to the firm Durand & Huguenin S. A., Basel, Switzerland No Drawing. Application August 19, 1937, Serial No. 159,970. In Germany September 2, 1936

6 Claims. (Cl. 260—335)

It has been found that sulphonated coeruleins can be obtained by treating a reduced gallein with a dehydrating and at the same time sulphonating agent. Such agents are concentrated sulphuric acid, monohydrate, oleum of various concentrations, chlorosulphonic acid. It is thus under quite mild conditions possible, already at room temperature (20–30° C.), to obtain ring-closing to the anthraquinone-ring (coerulein) and sulphonation of the latter. The reaction proceeds in two independent phases. If concentrated sulphuric acid of 96 per cent strength is used as dehydrating agent, in the cold chiefly the unsulphonated leuco-compound of the coerulein will be formed, from which, by means of an oxidation the coerulein will be obtained. It is only by slightly heating the reaction mass, that sulphonation takes place.

It has to be assumed that the formation of a sulphonated coerulein according to the above process results from an intermediate formation of reduction products and it is to be understood that the term sulphonated coerulein in the present specification also includes reduction products of the dyestuff.

If in the present process instead of gallein-dihydroxyfluorescein (see Colour Index No. 781) substituted galleins are used, similar dyestuffs are obtained.

Summarily the aim of the herein described process is to produce sulpho derivatives of a body corresponding to the general formula

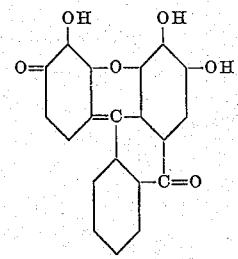

including the dyestuffs themselves as well as reduced stages thereof as formed by the present process.

The manufacture of sulphonated coerulein has already been described (see German Patent No. 445,847). According to the process disclosed therein, coeruleins are treated with fuming sulphuric acid in the presence of boric acid. The example of the above mentioned patent shows that 4 parts of coerulein are heated up for 2–3 hours to 130–140° C. together with 3 parts of (crystallized) boric acid and 30 parts of fuming sulphuric acid containing 60% $SO_3$.

In comparison therewith, the new process allows the manufacture of sulphonated coeruleins under much milder conditions, and according to the invention a body is obtained, which in dyeing and printing yields very bright and pure shades.

The following examples illustrate the invention:

Example 1

40 parts of reduced gallein, obtained according to Buchka, Annalen der Chemie, vol. 209, page 268, or by reducing gallein in an acidified watery solution, for instance with zinc and hydrochloric acid, are poured into 200 parts of chlorosulphonic acid, keeping the temperature at 0–10° C. Afterwards the temperature is allowed to rise slowly. The mass is stirred for several hours at 25–30° C., until of a sample precipitated with water and etherized, the ether does no more show a yellow or a green fluorescent color. The whole is then discharged into a mixture of ice and water and the sulphonic acid is separated by salt. After filtration, washing with a common salt solution and drying, a dark powder is obtained, which dyes chromated wool bright, green shades.

In the above example, the chlorosulphonic acid can be replaced by the same quantity of sulphuric acid monohydrate or by a weak oleum without affecting the result.

Example 2

40 parts of reduced gallein are introduced at a temperature of 0–10° C. into 150 parts of concentrated sulphuric acid of 96 per cent strength. There are slowly added at the same temperature 51 grs. of oleum (60%). When proceeding thereupon as described in Example 1, the same product is obtained. In using sulphuric acid of 96 per cent strength alone, in order to enable the reaction, it is necessary to raise the temperature somewhat.

What I claim is:—

1. A process for the manufacture of sulphonated coeruleins by treating a reduced gallein with an agent having dehydrating and sulphonating properties.

2. A process for the manufacture of sulphonated coeruleins by treating a reduced gallein with concentrated sulphuric acid.

3. A process for the manufacture of sulphonated coeruleins by treating a leuko-gallein with sulphuric acid monohydrate.

4. A process for the manufacture of sulphonated coeruleins by treating a reduced gallein with fuming sulphuric acid.

5. A process for the manufacture of sulphonated coeruleins by treating a reduced gallein with chlorosulphonic acid.

6. Sulphonated coeruleins resulting from the treatment of a reduced gallein with a dehydrating and at the same time sulphonating agent, including the dyestuffs themselves as well as reduced stages thereof, said coeruleins constituting dark water-soluble powders giving with concentrated sulphuric acid olive-green solutions and yielding in dyeing on wool bright, green shades of good fastness properties.

EDUARD PEYER.